Oct. 19, 1926. 1,603,924
A. M. ROSSMAN
FLOW INDICATOR AND THE LIKE
Filed May 18, 1921 3 Sheets-Sheet 3

Inventor
Allen M. Rossman
by Brown Boettcher Dienner
Attorneys

Patented Oct. 19, 1926.

1,603,924

UNITED STATES PATENT OFFICE.

ALLEN M. ROSSMAN, OF CHICAGO, ILLINOIS, ASSIGNOR TO SARGENT & LUNDY, INCORPORATED, OF CHICAGO, ILLINOIS, A CORPORATION OF ILLINOIS

FLOW INDICATOR AND THE LIKE.

Application filed May 18, 1921. Serial No. 470,651.

My invention relates to flow indicators and the like.

In certain situations it is desirable to maintain a continuous flow of fluid, such, for instance, as a cooling water for a transformer, an internal combustion engine, or the like; where such flow of fluid is essential to the operation of the transformer, internal combustion engine, or the like, it is desirable to have a device which will indicate what the rate of fluid flow through the cooling system is, and to indicate when the flow ceases, by means of an alarm which will call the attention of the attendant to the fact that the necessary flow has ceased.

For instance, in the cooling of transformers, it is essential that a continuous flow of cooling fluid be maintained to prevent overheating and damage to the coils of the transformer. The flow may be interrupted for a short period of time without damage to the transformer, but it is very desirable that the attendant be apprised of the fact that the flow has ceased, or has dropped below a certain limit, as soon as such limit has been reached, so that steps may be taken either to discontinue operation of the transformer, or to re-establish the flow.

I am aware that devices have heretofore been proposed for accomplishing this purpose, but from my investigation I find that they are particularly susceptible to disarrangement and clogging up, as well as failure, due to the deposit of sediment or corrosion of the working parts.

It is the object of my invention to provide a flow indicator and limit alarm device of simple and rugged construction, which shall be affected as little as possible by corrosion or deposit of sediment upon the working parts, and which shall be positive in operation, and easy to keep in proper working order, with the minimum of attention.

In order to acquaint those skilled in the art with the manner of constructing and operating a device embodying my invention, I shall now describe, in connection with the accompanying drawings, the preferred embodiment of my invention.

Figure 1:
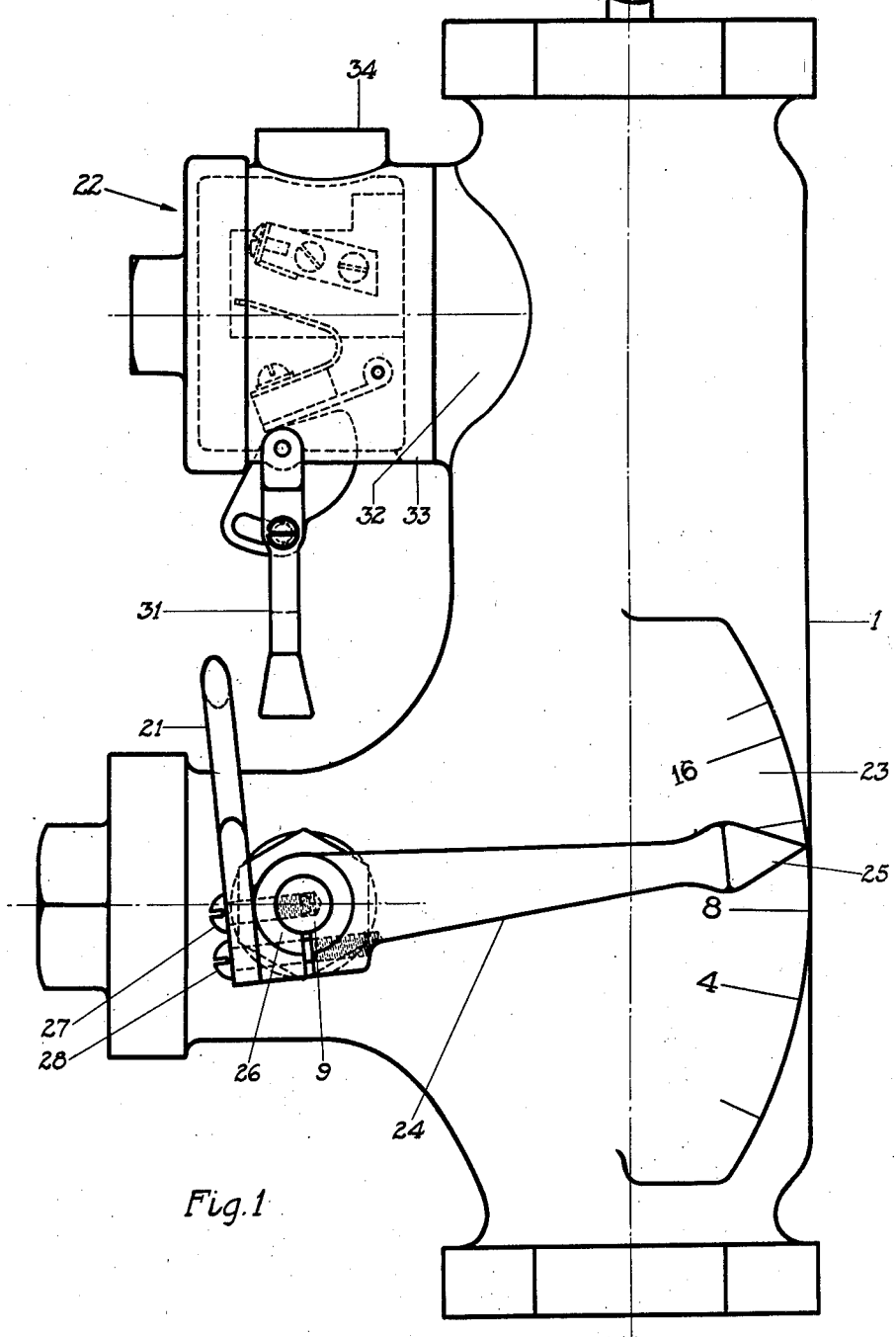
Figure 1 is a front elevation of a device embodying my invention.

The device of my invention comprises a main body of generally tubular formation, this body 1 having at its upper end a threaded connection 2 for connecting with an outlet pipe 3, and having at its lower end a connection at 4 for the inlet pipe 5. The inlet end is divided from the outlet end by means of a wall 6, which is provided with a central aperture for cooperating with the tapered plug 7. The plug 7 may be tapered, or may be given any suitable form, as will be apparent from the later description.

The body 1 is provided with a lateral projection 8, which provides a bearing for a cross shaft 9, this cross shaft being connected to an arm 10, which arm 10 is at its outer end connected by a suitable pivot pin 11 to the lower end of the valve body or plug 7. This arm forms both a guide and a motion-transmitting means for the plug 7.

The arm 10 has a slip clamp 12 for engaging the shaft 9, and in addition is provided with a pin, in this case in the form of a machine screw 13, for pinning the arm and the shaft 9 together.

The tubular portion 8 is provided with a removable wall 14 in the shape of a screw plug, for permitting access to the interior of said tubular portion 8.

Figure 3:
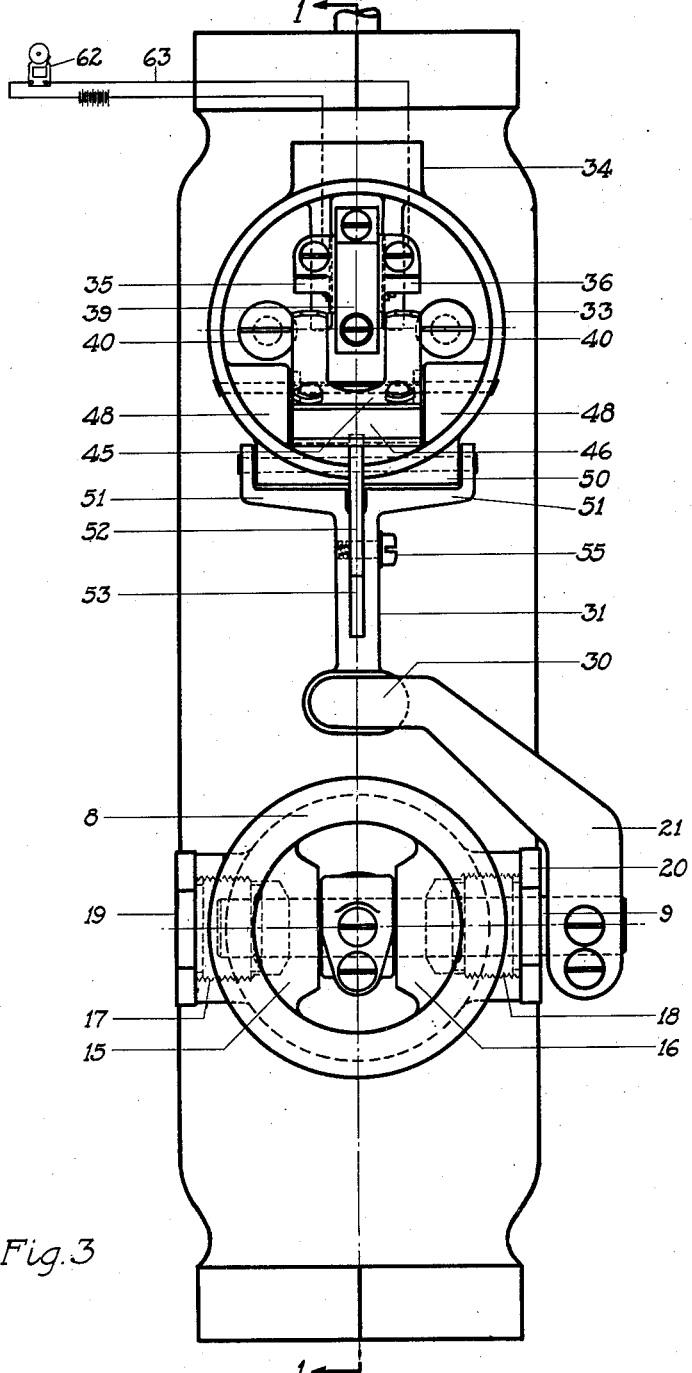
Figure 3 is a left side elevation of the device shown in Figs. 1 and 2.

The side walls of the tubular portion 8 are enlarged as shown at 15 and 16 to provide bearings for the shaft 9, these bearings being recessed and threaded, as indicated at 17 and 18, in Figure 3. The two sides of the enlargement 8 are made in the same configuration, so that the device may be made to indicate the flow either on the right or the left side, as desired. As shown in Figure 3, the left end or recess 17 is closed by a screw plug 19, since the shaft 9 terminates short of the outer end of said recess, and the right hand recess receives a packing gland 20 through which the shaft 9 projects for the attachment of an indicating arm 24 to which an alarm operating arm 21 is fastened to control a switch designated generally as 22, for giving a predetermined alarm.

Upon the outside of the main body 1, and upon each side thereof, I provide an integral indicating or scale portion 23, which is graduated, as is shown in Figure 1, in terms of flow. An indicating arm 24 is connected to the shaft 9, this arm being provided with a pointer or indicator 25, and a split clamping portion 26, which is connected to the outer end of the shaft 9. The alarm operating arm 21 is secured upon the end of the arm 24 by means of the machine screws 27 and 28, the machine screw 27 serving as a pin to pin the split clamp 26 to the shaft 9, and the machine screw 28 serving to clamp the split clamp 26 upon the end of the shaft.

It will be apparent that the arm 21, and indicating arm 24, may be mounted upon the opposite side of the main body 1, as well as upon the side herein illustrated, by merely reversing the arrangement of the nut 19 and gland 20. The arm 21 is reversed, so that it reaches from the left side towards the center, instead of from the right side toward the center, as shown in Figure 3. This arm 21 has a finger 30, which is adapted to engage a lever 31, for operating the alarm switch, to be described later.

Figure 2:
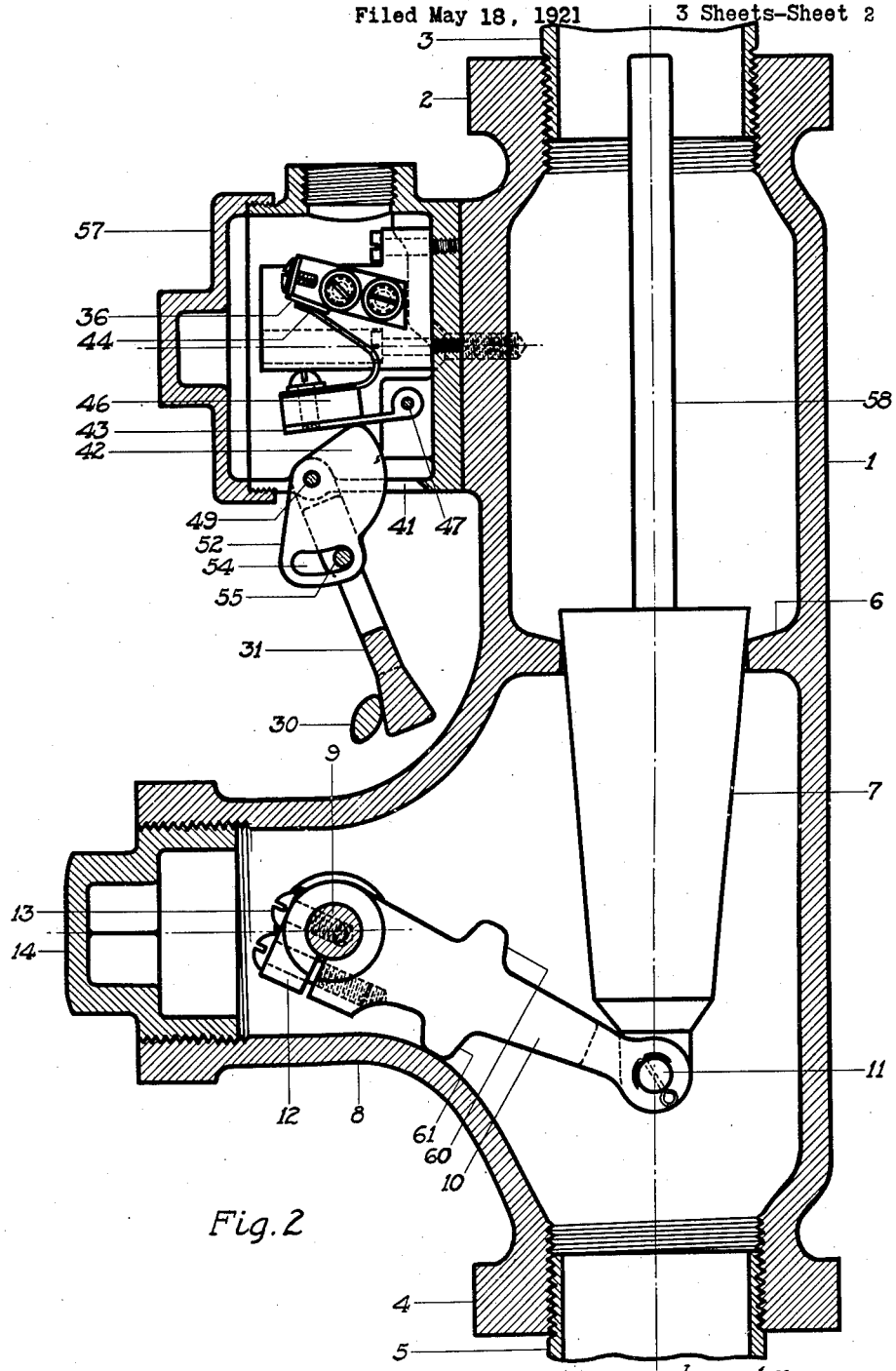
Figure 2 is a vertical, longitudinal section taken on the line 1—1 of Figure 3.

The main body 1 has formed thereon a boss 32, upon which is mounted a cup or box 33, this box having a threaded inlet opening 34 adapted to connect to the usual conduit, through which the electric connections are led. The box 33 contains a switching element, consisting of the stationary contacts 35 and 36, which are attached to block 39, mounted in the center of the cup. The cup itself is secured upon the boss 32 by means of the machine screws 40. The lower portion of the cup is provided with a slot, as shown at 41 in Figure 2, through which projects a cam arm 42 for engaging a swinging lever 43, upon which is mounted a pair of spring contact fingers 44, these spring fingers being connected together preferably by being stamped out of a single piece of metal, as is indicated at 45, in Figure 3. The spring fingers 44 are mounted upon a block of insulation 46, which, in turn, is mounted upon the swinging lever 43. The swinging lever 43 is mounted upon a pin 47, secured in suitable bosses 48 on the inside of the cup.

The lever 31 is forked at its upper end to embrace a boss 50, through which passes a mounting pin 49, for the ends of the forks 51. Thus, the lever 31 is mounted independently of the cam arm 42. The cam arm has a downwardly extending adjusting portion 52, which lies in a slot 53, cut in the arm 31. The lower end of the adjusting arm 52 is provided with a slot or eye 54, through which passes a clamping screw 55 for clamping the sides of the swinging arm 31 upon said adjusting arm 52. This adjustment is made to control the point at which the alarm will be operated; that is to say, the alarm may be set to operate at a certain predetermined minimum flow through the device, and the minimum may be predetermined and the switch adjusted accordingly, so that the alarm will not be operated so long as the flow is above the predetermined minimum.

The outer end of the box or cup 33 is closed by a screw plug 57, this cap being removable for inspection of the contacts.

A guiding rod 58 is secured to the upper end of the valve plug or body 7, this rod being adapted when the valve plug is raised, to a point clear of the seat in the wall 6, to engage on the inside of the pipe 3, so that the plug may be prevented from catching along the seat. The arm 10 is provided with projections 60 and 61, these projections forming stops against the adjacent portions of the extension 8 for limiting the upward and downward movement of the valve body or plug 7.

The operation of the device is as follows: Assuming that the device is connected in series with the flow of cooling water, such, for instance, as for transformer, and it is desired to maintain a flow of a predetermined amount as a minimum, the pin 55 will be loosened, and the cam arm 42 adjusted with respect to the operating lever 31, so that for a certain position of the plug 7 the alarm switch will not be closed, but if the plug drops lower than the predetermined position, the switch will be closed giving the alarm by closing the electric circuit 63, and giving an indication, such as ringing the bell 62, that insufficient cooling liquid is passing through the circuit.

Plugs of various contours may be provided in order to secure graduating effects of different character with respect to the scale 23. I have employed plugs with curved contour, instead of straight contour, in order to secure a greater range of operation within a given length of plug, and to secure a desired type of scale graduation. I have also employed plugs of different degrees of taper, in order to vary the range of the instrument. The incoming water enters the body 1 by way of the pipe 5, and passes upwardly between the valve body 7 and the seat in the wall 6, serving to raise the valve plug 7 to a position where sufficient opening exists to permit the liquid to flow under a given pressure. So long as the position of the valve plug 7 is above the predetermined limit, the alarm switch will remain open, but if the valve plug 7 moves down below the limiting position, the finger 30 on the arm 21 moves the cam arm 42 against the swinging switch lever 43, closing the switch contact and energizing the alarm. The attendant is then apprised of the fact that insufficient cooling water is flowing through the system, and that steps must be taken either to restore the flow of cooling water, or to stop the operation of the device involved, such as the transformer, or the like.

The switch which I have shown is operated by gravity, but it is apparent that a spring may be employed for opening the switch, and that instead of a plain contact-making switch, I may provide a snap switch, or a switch of any preferred type.

I have found it advisable to make the metal parts of brass or bronze, to secure freedom from corrosion, but this is not essential. The device is employed in the upright position, as shown in the drawings, so that the weight of the plug 7 is able to operate the switch, but it is obvious that instead of a gravity load, a spring load might be employed to perform the same function. A spring is less desirable, because of the additional cost, and the difficulties attendant to securing uniform action, and probable corrosion or fouling of the spring, if exposed to the cooling water.

The plug 7 need not move centrally of the hole in the wall 6, since the opening is defined by the difference of the two areas, namely, the area of the opening in the wall 6 and the area of cross section of the adjacent part of the plug, whether these two parts be concentric or not.

I do not intend to be limited to the precise details of construction shown and described.

I claim:

1. In a device of the class described, a main body having a port therein, a vertically tapered plug member adapted to obstruct said port, said member being raised by the pressure of the fluid passing through the port and being closed by gravity, a rotary shaft mounted in the body and extending outside of the same, a connection between the said shaft and the lower end of the plug serving to guide the lower end of the plug, and a switch outside the main body, and means actuated by the shaft for controlling the switch to operate an alarm circuit only when the flow through the port drops below a predetermined minimum.

2. In combination, a vertical valve body having a valve port, a vertically guided valve plug adapted to close by gravity, a rocking cross shaft journaled below said port, a lever connecting said shaft to the lower end of said plug and forming a guide for the plug, an indicator connected to said shaft for indicating the rate of flow through the port, a switch operated by movement of said cross shaft when the plug is a predetermined minimum distance from the port.

3. In combination, a main body member adapted to be disposed vertically and having a valve port therein, a plug member adapted to obstruct said port to a varying degree corresponding to its position, a shaft mounted at one side of the body and extending through the walls thereof, an arm connecting the shaft and the bottom of the plug within the body, said arm forming the sole guide for the lower end of said plug, a substantially horizontal indicating arm carried by the shaft outside of the body, and a cooperating scale formed on the side of said body for indicating in connection with said indicating arm the rate of flow through the port.

4. In combination, a body, having a longitudinal passageway including a valve port, a valve plug for obstructing said port, said plug being tapered with its smaller end facing against the flow of fluid through the passageway, said plug having a guiding member attached at its upper end, a lateral extension below said port communicating with the passageway, a cross shaft journaled transversely in said lateral extension and extending to the outside thereof, an arm lying within the lateral extension and secured to said cross shaft, said arm being connected to the lower end of said valve body to guide the same, a scale on the side of the body, and an indicating arm secured to said shaft and co-operating with the scale.

5. In combination, a main body member having a longitudinal passageway therein, a valve port, a tapered valve plug for obstructing said port, said plug being adapted to be raised from said port by the flow of fluid through said port, said body having a lateral tubular extension below said port, a shaft journaled crosswise in said tubular extension, and extending outside of the same, a connecting arm secured rigidly to said shaft, and pivotally connected to the bottom of said plug to guide the same, a chart mounted on the side of said body, and an indicating arm secured to the shaft and co-operating with said chart.

6. In combination, a main tubular body comprising a longitudinal passageway having a valve port, a tapered plug co-operating with said valve port to close the same, said plug being supported substantially in vertical position in order to close off said port by gravity, a lateral tubular extension being formed on said casing below the port, said tubular extension having its outer end closed, said extension providing bearings, a cross shaft mounted in said bearings, said shaft extending through one of the bearings and outside of the tubular extension, a connecting arm secured to the shaft between said bearings, and connected to and guiding the smaller end of said valve plug, an indicating arm connected to said shaft, a switch and a switch operating arm also connected to said shaft for closing the switch when the plug has moved to a predetermined minimum opening of the valve port.

7. In combination, a tubular body having a longitudinal passageway including a valve port, a tapered plug co-operating with the valve port, said plug being arranged preferably in vertical position to close the valve port by gravity, a lateral extension of the body below the valve port, a shaft journaled in said body and extending therefrom, a connecting arm secured to the shaft and pinned to the lower end of the valve plug for guiding the same, said arm lying in said lateral extension and having stops to limit the motion of the arm, a switch housing secured to said body above said lateral extension, said housing containing a switch, a switch operating member comprising an adjustable arm, and a co-operating arm secured to said shaft.

8. In combination, a tubular body containing a central passageway including a valve port, a tapered plug for the valve port, the body having a lateral extension provided with a pair of bearings, a shaft mounted in the bearings and extending to the outside of the body, an arm secured to the shaft within the extension and connected to the lower end of the valve plug, means adjacent each of the bearings for receiving a screw plug, one of said plugs comprising a packing gland, and the other plug comprising a closure, said plugs being interchangeable, and a switch operating arm secured to the outer end of the shaft, said switch arm extending from the end of the shaft to a central point with respect to the housing.

9. In combination, a tubular body having a lateral projection, a tapered valve plug in the body, said lateral extension having a pair of bearings, a cross shaft in said bearings, said shaft extending out of one of the bearings, said bearings being arranged to receive interchangeable screw plugs, one of said plugs forming a closure, and the other forming a gland for the shaft, an arm lying within the lateral extension and connected to and forming a guide for the lower end of the valve plug, an indicating arm secured to the outer end of the shaft, said arms being releasable from the shaft and said plugs being interchangeable to provide a right or left connection of the parts and a switch operating arm having a lateral projection extending to the center of said lateral extension, to engage the operating member of an alarm controlling switch.

10. In combination, a main body comprising a valve port, a movable member comprising a valve plug for obstructing said port, a main shaft, means for rocking said shaft according to the movement of said valve plug, a switch member for controlling an alarm circuit, a switch operating arm, an actuating arm for the switch operating arm, said arms being connected together by an adjustable connection, and a co-operating arm secured to the main shaft, said co-operating arm being adapted to engage the actuating arm when the valve plug moves to a position defining the minimum opening through the device.

11. In a device of the class described, a main body having a longitudinal opening therethrough, a valve port being formed in said opening, a tapered plug member adapted to control said port, said member being raised by the pressure of the fluid passing through the port and being closed by gravity, a rotary shaft having a guiding arm connected to the lower end of the plug and lying below said port and having switch controlling means, and a switch controlled by said shaft for operating an alarm circuit when the flow through the port drops below a predetermined minimum.

12. In combination, a vertical tubular body having a substantially axial port therein, a tapered plug adapted to obstruct said port, a rotary shaft below the port, an arm on the shaft connected to and guiding the lower end of the plug, a switch comprising a stationary contact mounted on the body above said rotary shaft, a pivoted switch member tending to open by gravity, said switch member being pivoted on a horizontal axis, a cam member pivoted on a horizontal axis below said movable switch member, an operating arm depending from said cam member, said operating arm being adjustable with respect to the cam member, and an operating finger secured to said shaft and adapted to engage the operating arm and close the switch when the opening through the port is reduced to a predetermined minimum.

13. In combination, a tubular body having a lateral extension, a restriction in said body above the extension forming a port, a plug member for obstructing said port in varying degree, a rocking shaft mounted in said extension, and extending to the outside thereof, means connecting the plug and the shaft, a scale formed directly on the side of the body adjacent the extension, and a generally horizontal pointer mounted on said shaft and cooperating with said scale.

14. In combination, a tubular body having a lateral extension, a restriction in said body above the lateral extension forming a port, a plug member for obstructing said port in varying degree, a rocking shaft mounted in said extension, means connecting said shaft to the lower end of said plug member, said shaft extending to the outside of said lateral extension, a switch box mounted on the body above said extension, a switch in said box having an operating arm extending toward said extension, and an operating finger connected to the rocking shaft and extending upwardly and over the extension to engage the operating arm for operating the switch when the opening through the port reaches a predetermined minimum.

15. In combination, an elongated body adapted to be disposed vertically, said body having an axial passageway therethrough and having a restriction forming a port, a tapered plug adapted to extend through said port, said plug having a guiding rod extending upwardly through the body, a lateral extension on said body below said port, a shaft mounted in said extension and being adapted to extend out of either side of the extension, a connecting arm between the lower end of the plug and said shaft and a bent finger adapted to be secured to one end of the shaft and to extend laterally over the extension.

16. In combination, an elongated body adapted to be vertically disposed, said body having an opening therethrough and having a restriction in said opening forming a port, a generally tapered valve plug adapted to cooperate with said port, said plug having a guiding stem extending upwardly substantially axially of the plug, a lateral extension below the restriction forming the valve port, a shaft journaled in said lateral extension and extending to the outside thereof, an arm pinned to the shaft and pivoted to the lower end of the plug, a switch mounted on the side of the body above the lateral extension, an arm depending from said switch substantially centrally of the lateral extension, said lateral extension having bearings, one of said bearings providing a closed end and the other providing a stuffing-box for the shaft, said bearings being interchangeable and a bent arm secured to the extending end of the shaft, said bent arm reaching over the lateral extension into position to cooperate with the depending switch arm.

17. In combination, an elongated body having a restriction therein forming a port, a plug cooperating with said port, said body having a lateral extension, interchangeable bearings in said lateral extension, a shaft mounted therein, the said bearings permitting said shaft to extend from either side as desired, graduations formed on each side of the main body, an indicating arm having a split clamp for securing the same to the outer end of said shaft, a switch mounted above the lateral extension, said switch having a depending operating arm, a bent arm clamped against the end of the split clamp for the indicating arm and having an end extending over the lateral extension to cooperate with the switch operating arm, said indicating arm and said bent arm being applicable to either side of the main body for left or right assembly, and means connecting the plug with said shaft.

18. In a device of the class described, an elongated body member having a valve port therein, a conical plug valve facing downwardly for controlling the port, said body having an inlet below the port, and having a lateral extension below the port, a cross shaft journaled in the extension, and a connecting arm pivoted to the lower end of the valve and rigidly secured to the shaft, said arm serving as the sole guiding means for the lower end of the plug and an indicating device actuated by said cross shaft.

19. In a device of the class described, a main body having a port therein, a plug member adapted to obstruct said port in a varying degree, said plug being raised by the pressure of the fluid passing through the port, and being closed by gravity, a shaft having means connecting it to the lower end of said plug, a switch secured to the main body, an adjustable arm connected to said switch, and means connected to said shaft for actuating said adjustable arm when the flow through the port drops below a predetermined minimum.

In witness whereof, I hereunto subscribe my name, this 10th day of May, A. D. 1921.

ALLEN M. ROSSMAN.